United States Patent [19]

Derbyshire

[11] 3,934,891

[45] Jan. 27, 1976

[54] DRILL CHUCK AND METHOD OF ASSEMBLY

[75] Inventor: George C. Derbyshire, Sheffield, England

[73] Assignee: The Jacobs Manufacturing Co., Ltd., Sheffield, England

[22] Filed: Apr. 9, 1974

[21] Appl. No.: 459,382

[30] Foreign Application Priority Data
Apr. 11, 1973 United Kingdom............... 17343/73

[52] U.S. Cl. ................................................. 279/61
[51] Int. Cl.² ....................................... B23B 31/12
[58] Field of Search .................. 279/61, 62; 408/56

[56] References Cited
UNITED STATES PATENTS

| | | |
|---|---|---|
| 1,857,748 | 5/1952 | Walker ................................. 408/56 |
| 3,462,164 | 8/1969 | Wightman............................. 279/62 |

*Primary Examiner*—Harrison L. Hinson
*Assistant Examiner*—Leon Gilden
*Attorney, Agent, or Firm*—Stephen J. Rudy

[57] ABSTRACT

A drill chuck having a rotatable nut member for advancing and retracting converging jaws, and provided with passages for feeding lubricant to the groove in which the nut is rotatable. And a method of assembling the components of the chuck in dry condition and subsequently feeding lubricant through the passages to the groove in which the nut is rotatably mounted.

4 Claims, 6 Drawing Figures

DRILL CHUCK AND METHOD OF ASSEMBLY

BACKGROUND OF THE INVENTION

The invention relates to drill chucks and in particular to their method of assembly and has for its object to provide an improvement in or modification of the invention claimed in U.S. Pat. No. 3,810,642, dated May 14, 1974.

According to one aspect of the invention, there is provided an improvement in or modification of the invention claimed in U.S. Pat. No. 3,810,642, dated May 14, 1974, according to which a drill chuck is provided with a body part in which jaws are slidably mounted for converging movement in respective guides; a nut member rotatably mounted on the body part but axially located in a circumferential groove encircling said body part, said nut member having screwthreaded engagement with said jaws for advancing said jaws through a forward portion of the body part to grip a drill shank; a gear element with which the teeth of an extraneous chuck key may be engaged to tighten or slacken the jaws; and a cylindrical or generally cylindrical sleeve formed separate from, but connected to, said gear element and extending rearwardly of the body part to rotatably engage a cylindrical portion of the body part remote from the nut member, the improvement or modification residing in the fact that at least one passage extends from an axially extending bore in the body part to the circumferential groove in which the nut member is rotatably mounted, the arrangement being such that the moving parts of the chuck can be lubricated by forcing lubricant into said axially extending bore under pressure so that it can pass through said at least one passage into said circumferential groove. Preferably, a plurality of passages will extend from said axially extending bore to said circumferential groove.

According to another aspect of the invention, there is provided a method of assembling a drill chuck as described above, the method including the assembly of the component parts in dry condition, that is to say, free of lubricant, followed by the forcing of lubricant under pressure into the axially extending bore in the body part so that lubricant passes through the passage or passages communicating with the circumferential groove in which the nut member is rotatably mounted. The method may include the connection of the cylindrical sleeve to the halves of the nut member or to the gear element, or to the halves of an integral nut and gear element, purely by pressing them together or by the use of an adhesive.

BRIEF DESCRIPTION OF DRAWING in order that the invention may be fully understood and readily carried into effect, the same will now be described (by way of example only) with reference to the accompanying drawings, of which:

DETAILED DESCRIPTION OF PREFERRED EMBODIMENT

Figure 1:
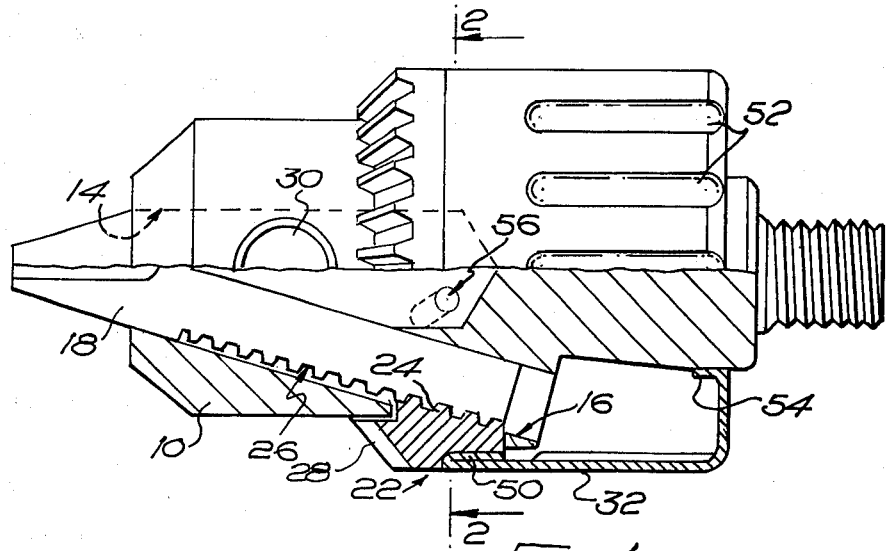
FIG. 1 is a part-sectional side view of a drill chuck embodying the invention.
Figure 2:
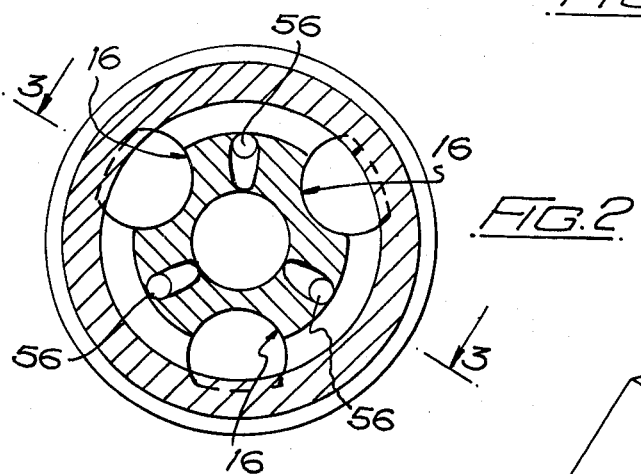
FIG. 2 is a sectional view on the line 2—2 in FIG. 1.
Figure 3:
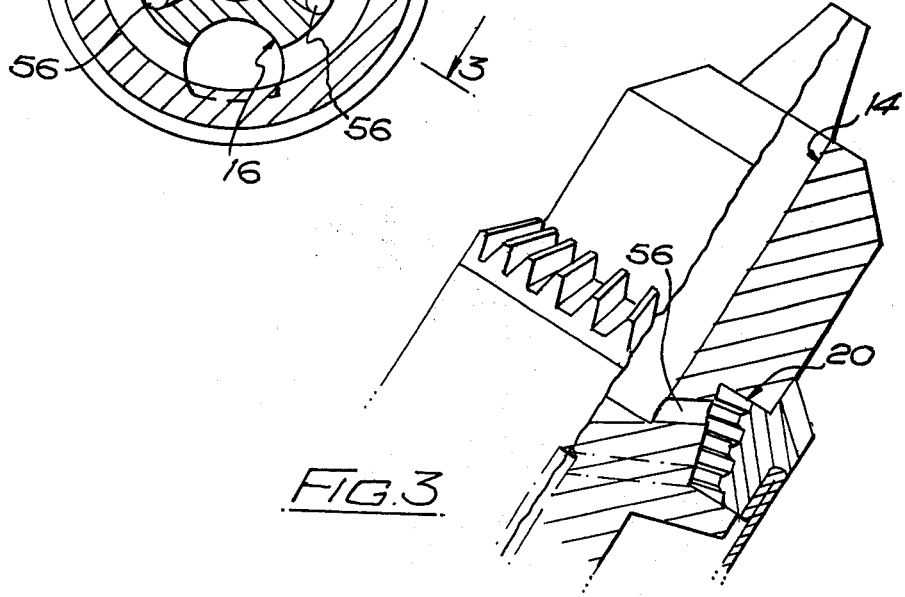
FIG. 3 is a part-sectional view on the line 3—3 in FIG. 2.

Referring now to FIGS. 1 to 3 of the drawings, the drill chuck illustrated includes a body part 10 having at one end a screwthreaded spigot portion by means of which it can be mounted on a power tool and at its other end an axially extending bore 14 for the reception of a drill shank (not shown). Three equally spaced bores 16 (only one of which is shown in FIG. 1) diverge from the axially extending bore for the reception of respective jaws 18; the jaws being slidably mounted in the bores 16 so that as they are advanced they converge to grip a drill shank between parallel end portions and when they are retracted into the body part they release the shank.

A circumferential groove 20 extends around the body part intermediate its ends and breaks into the bores 16. An integral nut and bevel gear element generally indicated 22, formed in halves so that the nut portion 24 can be located in the groove 20, is axially located by its engagement in said groove. Said nut portion is formed with a tapering internal screwthread and has threaded engagement with thread elements 26 of the jaws 18. The bevel gear portion of the element 22 surrounds a cylindrical portion of the body part in which three equally spaced radial blind bores 30 are formed, said blind bores being provided for the reception of a pilot end of an extraneous chuck key (not shown) having a bevel pinion capable of engaging the teeth of the bevel gear portion 28. In this way, the chuck jaws can be simultaneously advanced or retracted, as required, in known manner.

The integral nut and bevel gear element 22 which, as previously stated, is formed in halves, is held together by a generally cylindrical sleeve 32 which has been formed as a pressing from a relatively light gauge metal plate. Substantial strength has been imparted to the sleeve (at that end which tightly encircles the integral nut and bevel gear element) by forming it with a completely inturned edge 50; it will be observed that the integral nut and bevel gear element is stepped for the reception of the inturned edge of the sleeve, the outside diameter of the sleeve being the same as the outside diameter of the bevel gear portion 28 of the element 22. The sleeve has also been formed with a series of flutes 52 which further strengthen the light gauge wall of said sleeve and in addition provide a convenient gripping surface for the user's hand when he requires to make manual adjustments. The end of the sleeve remote from the integral nut and bevel gear element is provided with an inturned flange 54 which engages rotatably on a cylindrical portion of the body part.

In has been found possible to connect the cylindrical sleeve on the integral nut and bevel gear element—to hold the halves of the latter together—merely by pressing them together. However, it is preferred that they be secured together by use of an adhesive. In this latter case, it is essential that the parts which are to be connected together in this way shall be free from grease until the connection has been made, but it is also desirable to be able to assemble the component parts together in dry condition, that is, free of lubricant, when the assembly is to be carried out merely by pressing the parts together. For this reason, three passages 56 have been drilled in the body part 10, interspaced with the bores 16 as shown in FIG. 2, so that they extend outwards from the bottom of the axially extending bore 14 to the circumferential groove 20. The arrangement is such that when the chuck has been assembled in dry condition (that is, free of lubricant) the moving parts of the chuck can be lubricated by forcing lubricant into the axially extending bore under pressure so that it can pass through the passages 56 into the circumferential groove 20. (This operation will, of course, be carried out using a grease gun having a nozzle specially adapted for insertion in the axially extending bore 14 and capable of forming a seal against the cylindrical wall of said bore.)

Figure 4:
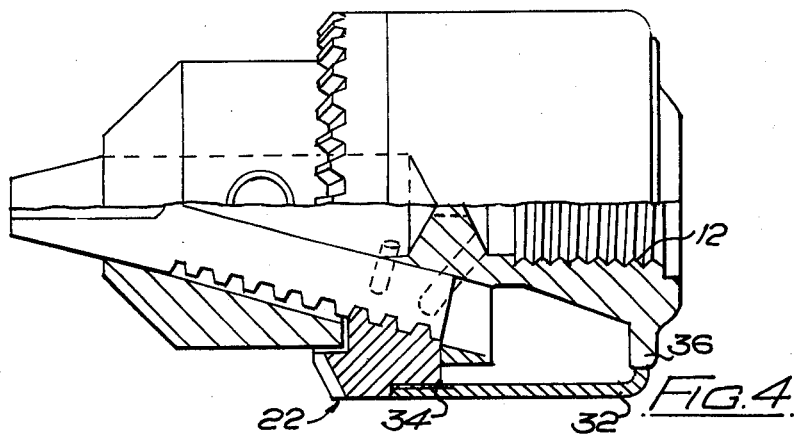
FIGS. 4, 5 and 6 are views similar to FIG. 1 which will be referred to when describing various modified constructions of chuck to which the invention can be applied.
Figure 5:
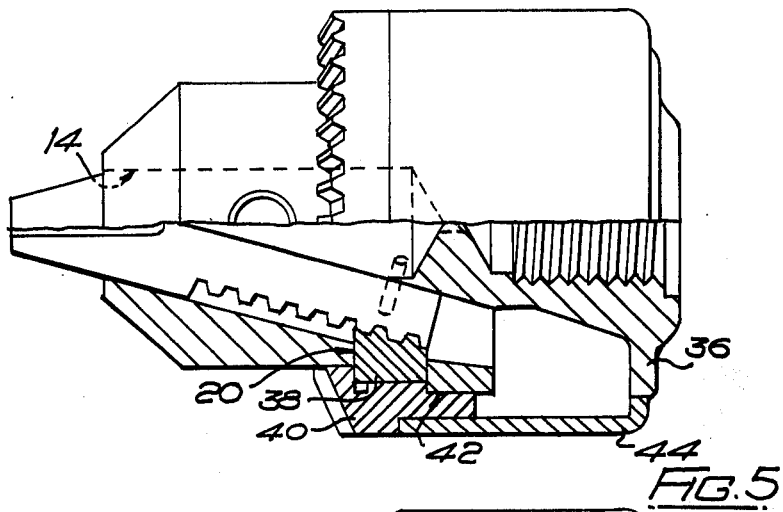
Figure 6:
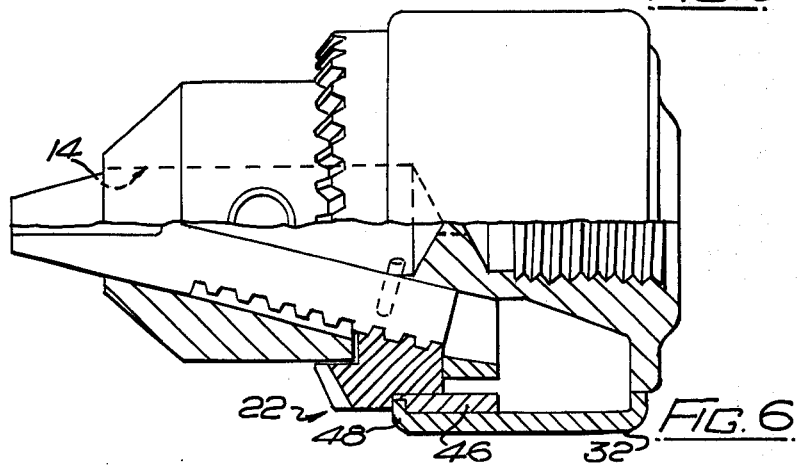

Referring now briefly to FIGS. 4, 5 and 6, these illustrate modified constructions of drill chuck to which the invention can be applied with equal facility.

In FIG. 4, there is illustrated a chuck which is almost identical to that previously described except that the sleeve 32 is made of a synthetic plastics material and has a metal reinforcing member 34 moulded in it at one end to provide a tight band encircling the stepped portion of the integral nut and bevel gear element 22. As in the previously described embodiment, the sleeve will be connected to the element either by pressing or with the aid of an adhesive.

In FIG. 5, there is illustrated a form of chuck which differs from those previously described in that the integral nut and bevel gear element has been replaced by separate nut and bevel gear elements 38 and 40. In this case, only the nut has required to be made in two halves so that it has been able to be engaged in the groove 20. The bevel gear element has been formed as an unbroken ring which encircles the nut to hold it together. A cylindrical sleeve 44 encircles a part of the bevel gear element at one end and a flange 36 formed on the body part at the other. However, in this case, the sleeve plays no part in holding together the halves of the split nut and, consequently, if made of a synthetic plastics material, it need not be provided with a moulded-in reinforcement member. (It will, of course, be understood that the sleeve could be made of steel, either of drawn tube or machined from the solid.) This construction of chuck may also be assembled using a suitable adhesive, but even if assembled by pressing it is convenient if this can be done in a dry conditon, that is, free of lubricant.

In FIG. 6, there is illustrated a construction of chuck similar to that described with reference to FIGS. 1 to 3 but in this case the integral nut and bevel gear element 22, formed in halves, is held together by a substantial metal band 46 which has been forced onto the stepped portion of the integral nut and bevel gear element before the cylindrical sleeve 32 has been assembled in position. In this case, the cylindrical sleeve is very slightly inturned as shown at its end 48 which encircles the metal band and the latter is stepped so that the cylindrical sleeve is able to snap into position therein. The sleeve is in this case made of a synthetic plastics material and is able to be forced over the wider part of the metal band on assembly. A suitable adhesive may be used to secure the metal band on the stepped portion of the integral nut and bevel gear element but again, even if the chuck is to be assembled by pressing, it is convenient if this can be done in a dry condition free of lubricant. In all these different modifications, there is shown to be provided at least one passage extending from the axially extending bore 14 to the circumferential groove in which the nut member is rotatably mounted.

Various other modifications could, however, be made without departing from the scope of the invention. For example, in FIG. 4 in which the body part of the chuck is shown to be provided with a screwthreaded recess 12 instead of a spigot portion for fitment to a power tool driving spindle, there is shown in chain-dotted lines a passage which extends to the circumferential groove 20 from said screwthreaded recess instead of from the axially extending bore 14 so that lubricant can be forced into said groove through said recess after the chuck has been assembled in a dry condition. Similarly, in the construction illustrated in FIGS. 1 to 3, instead of communicating with the axially extending bore 14, the three passages 56 could be drilled as shown in chain-dotted lines in FIG. 3 to communicate with a hole drilled along the spigot portion, also as shown in chain-dotted lines. Lubricant would then be forced into the groove 20 by a grease gun applied to the outer end of the hole drilled along said spigot portion (and, of course, a grease nipple could be provided in a depression at the outer end of said drilled hole to facilitate periodic greasing if desired.)

What is claimed is:

1. A slidable jaw rotary chuck having a cylindrical body provided with a work receiving bore extending axially and partway into its front end, a group of jaw tracks in the body converging downwardly and forwardly to the axis of said bore, a work gripping jaw slidable in each track, a circumferential groove about the body opening into the tracks into which groove screw threads upon each jaw are exposed, a jaw actuating nut disposed in the groove having internal screw threads connected with the exposed screw threads of the jaws for selectively advancing and retracting the jaws as a set along the tracks to open or closed condition, an external key operable gear unitary with the nut having rotation relative to the body for imparting a selected direction of rotation to the nut, and a sleeve rotatable with and extending rearwardly from the gear covering over the periphery of the body rearwardly of the gear; wherein a port extending radially from the bore through the body opens into the groove to communicate directly with the screw threads of the nut, the bore being adapted to be pressurized through its front end with lubricant for passage of the lubricant through the port to the screw threads of the nut and as a consequence of rotation of the nut passage of the lubricant from the screw threads of the nut to the screw threads of the jaws.

2. A slidable jaw rotary chuck as in claim 1, wherein the jaw tracks are separated one from the other by a solid portion of the body and the port extends through said solid portion.

3. A slidable jaw rotary chuck as in claim 2, wherein there are three jaw tracks, each separated from the other by a solid portion of the body, and a separate port extends through each solid portion.

4. A slidable jaw rotary chuck as in claim 1, wherein the body has an internally threaded rear bore extending axially and partway into its rear adapted for connection to a driving spindle, and a port extending from the rear bore to the groove communicating directly with the screw threads of the nut for conducting to the screw threads of the nut lubricant entered under pressure into the rear bore.

\* \* \* \* \*